Patented Aug. 7, 1923.

1,463,881

UNITED STATES PATENT OFFICE.

ROSE C. FARRELL AND CHARLES E. COOGAN, OF NEW YORK, N. Y., ASSIGNORS TO EBEN E. OLCOTT, OF NEW YORK, N. Y.

PROCESS AND PRODUCT OF PREPARING STEARATE OF ZINC FOR USE IN RELIEVING PRICKLY HEAT, ETC.

No Drawing.     Application filed August 8, 1922. Serial No. 580,543.

*To all whom it may concern:*

Be it known that we, ROSE C. FARRELL and CHARLES E. COOGAN, citizens of the United States, residing at New York, in the county of New York and State of New York, have invented a new Process and Product of Preparing Stearate of Zinc for Use in Relieving Prickly Heat, etc., of which the following is a specification.

Our invention comprises a process of preparing stearate of zinc powder for use in relieving prickly heat, chafed, itching or sensitive skin, excessive perspiration, etc., and the invention also comprises an improved zinc stearate powder made in accordance with the process of this invention.

In carrying out our invention, we heat talc and paraffin wax together in a water bath to a temperature above the melting point of the wax used. The wax thus forms a film over the particles of talc.

After heating the paraffin wax and talc until the paraffin wax becomes melted and stirring the mass thoroughly together in order to cause the particles of talc to be coated with the wax, the same is allowed to cool and is then mixed with an equal volume of stearate of zinc. This mixture which has been so formed is then put up in the usual way for distribution and use.

The zinc stearate adheres in a uniform film to the waxed talc, improving the sifting, spreading and coating properties in the zinc stearate in a useful and economical way. Our process lessens the fatty cohesion of zinc stearate so that it sifts, spreads and coats more freely and uniformly than in its natural state, while preserving all of its natural curative and moisture-proof properties.

The proportion of wax to talc used is preferably three to five per cent of the mixture by weight, although other proportions may be employed.

By employing our process, the talc particles are first given a coating or film of paraffin wax and are subsequently coated or filmed with stearate of zinc.

What we claim is:

1. The process which consists in heating talc and paraffin wax to melt the wax, cooling the mass and adding zinc stearate to the same.

2. The process which consists in coating talc with a film of paraffin wax and subsequently adding zinc stearate to the same.

3. The process which consists in coating talc, in finely divided form, with a film of paraffin wax and subsequently mixing the same with stearate of zinc.

4. The process which consists in coating talc particles with paraffin wax and then coating the waxed talc particles with stearate of zinc.

5. A substance composed of particles of talc with an envelope of paraffin wax, and zinc stearate.

6. A substance composed of talc particles enveloped in successive films of paraffin wax and zinc stearate.

ROSE C. FARRELL.
CHARLES E. COOGAN.